United States Patent
Kumhyr et al.

(10) Patent No.: US 6,904,563 B2
(45) Date of Patent: Jun. 7, 2005

(54) EDITING PLATFORMS FOR REMOTE USER INTERFACE TRANSLATION

(75) Inventors: David Bruce Kumhyr, Austin, TX (US); Kin Hung Yu, Austin, TX (US); Keiichi Yamamoto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 09/826,987

(22) Filed: Apr. 5, 2001

(65) Prior Publication Data

US 2002/0147750 A1 Oct. 10, 2002

(51) Int. Cl.[7] .............................................. G06F 17/00
(52) U.S. Cl. ....................... 715/530; 715/746; 715/762
(58) Field of Search .................. 715/530, 536, 715/703, 746, 762; 707/4; 717/136, 143; 704/8

(56) References Cited

U.S. PATENT DOCUMENTS

| | | | | |
|---|---|---|---|---|
| 5,251,130 A | * | 10/1993 | Andrews et al. | 704/3 |
| 5,371,878 A | | 12/1994 | Coker | 395/500 |
| 5,442,788 A | | 8/1995 | Bier | 395/650 |
| 5,678,039 A | * | 10/1997 | Hinks et al. | 707/4 |
| 5,974,372 A | * | 10/1999 | Barnes et al. | 704/8 |
| 6,092,036 A | * | 7/2000 | Hamann | 704/8 |
| 6,275,790 B1 | * | 8/2001 | Yamamoto et al. | 704/8 |
| 6,275,978 B1 | * | 8/2001 | Bell | 717/143 |
| 6,311,151 B1 | * | 10/2001 | Yamamoto et al. | 704/8 |
| 6,496,844 B1 | * | 12/2002 | Hetherington et al. | 715/536 |
| 6,567,973 B1 | * | 5/2003 | Yamamoto et al. | 717/136 |
| 6,735,759 B1 | * | 5/2004 | Yamamoto et al. | 717/136 |

FOREIGN PATENT DOCUMENTS

| | | | | |
|---|---|---|---|---|
| JP | 8-166865 | 6/1996 | | G06F/3/14 |
| JP | 11-203186 | 7/1999 | | G06F/12/00 |

OTHER PUBLICATIONS

Liu et al., "Enhancing A GUI Event Recorder To Support The Creation Of User Documentation", 2000, Hope College, whole document.*

* cited by examiner

*Primary Examiner*—Joseph Feild
*Assistant Examiner*—James H. Blackwell
(74) *Attorney, Agent, or Firm*—Duke W. Yee; Jeffrey S. Labaw; Stephen J. Walder, Jr.

(57) ABSTRACT

Techniques for editing the text displayed by a computer program are disclosed. The present invention allows a translator to translate the text with minimal assistance from software developers or programmers. In one embodiment the text may be edited in its on-screen context without the editing user (or translator) having access to the actual program. In a second embodiment, an execution session of a software developer or programmer may be "recorded." An editor or translator can then "play back" the execution session using a scripting shell and an executable of the program, "pause" the session at appropriate places, and make onscreen changes to the text.

50 Claims, 5 Drawing Sheets

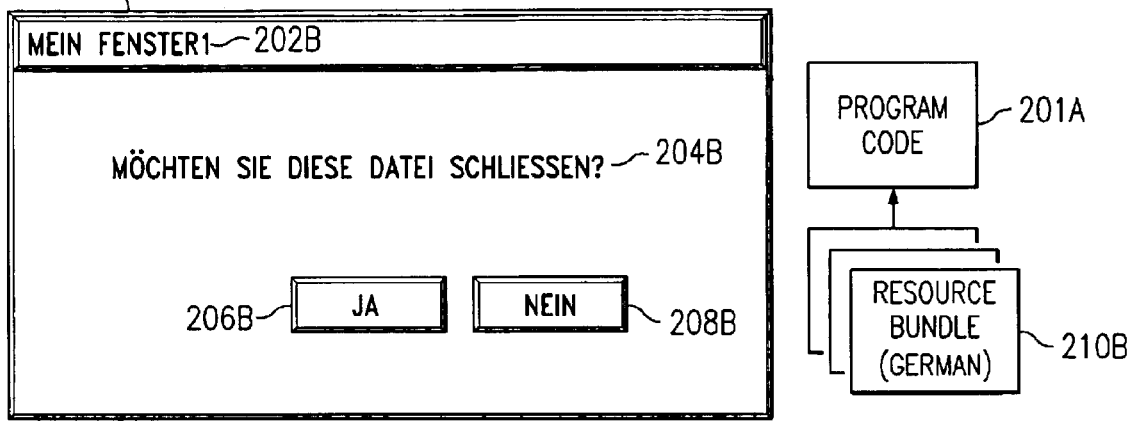

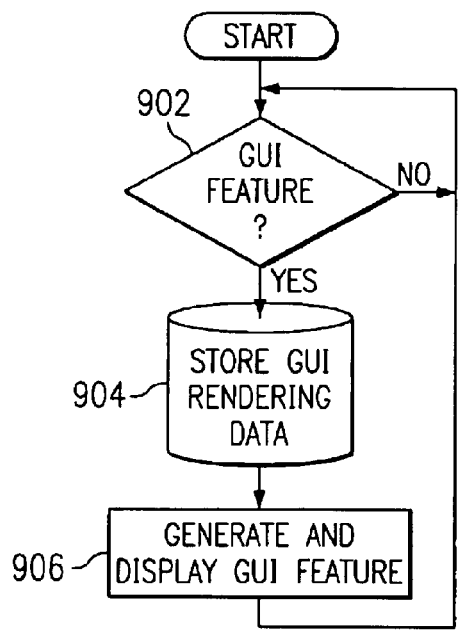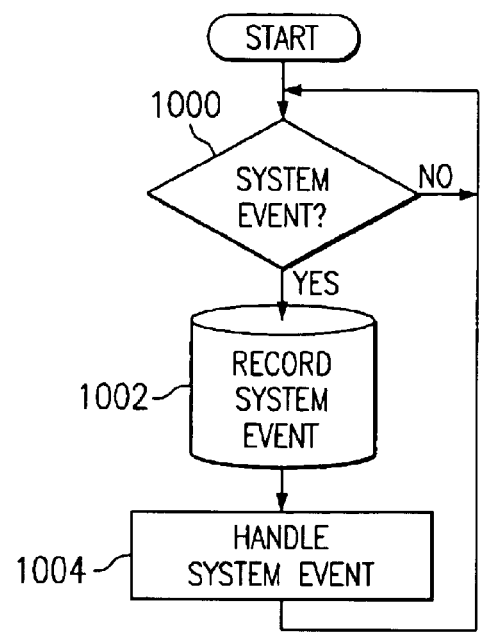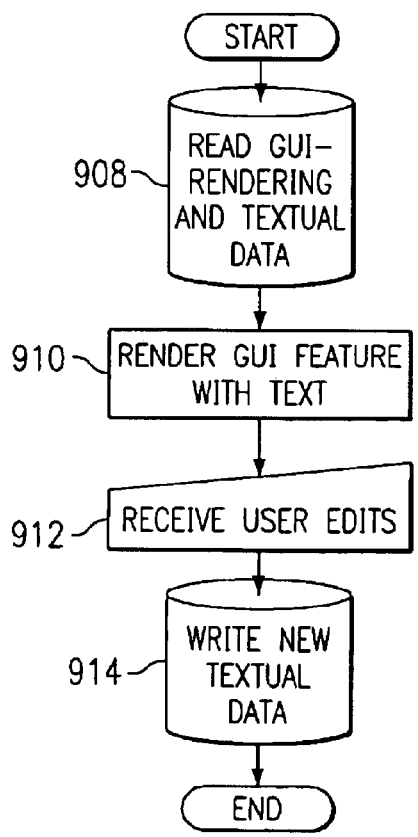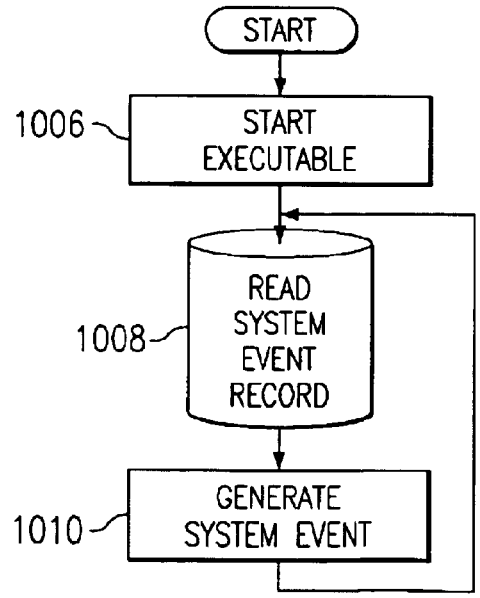

EDITING PLATFORMS FOR REMOTE USER INTERFACE TRANSLATION

BACKGROUND OF THE INVENTION

1. Technical Field

The present invention relates generally to tools for internationalization of software. More particularly, the present invention relates to an improved method, apparatus, and computer program for performing language translation in computer software.

2. Description of Related Art

Java is an object-oriented, compiled, multi-threaded computer language that generates platform-independent executable files.

Java is object-oriented. This means, in the simplest terms, that it allows for the association of member functions or "methods" within data structures. Indeed, all Java programs are made up solely of data structure types known as "classes," where classes contain both data fields and methods.

Classes may "inherit" characteristics of other classes. When a "descendant" class inherits from another "ancestral" class, it inherits all of the data fields and methods of the ancestral class. In addition, a descendent class may provide its own methods to supplement or take the place of ancestral class methods.

Java is compiled. That means that before a Java program (written as source code) can be executed, it must be processed by a compiler to make an executable form of the program. Executable Java programs are stored in ".class" files, with each ".class" file containing executable object code for a single Java class.

Java is multi-threaded. This means that a single Java program can have several sequences of code executing concurrently. Each of these sequences is known as a thread. Multi-threaded program languages, such as Java, are very useful when writing software such as, for instance, communication software, where it is helpful to allow the software to perform other tasks while waiting for input.

Java produces platform-independent executables. When a Java program is compiled to produce ".class" files, those ".class" files are capable of being executed on any platform having a Java runtime environment. A Java runtime environment is a piece of software that allows a computer to executes Java ".class" files. Java runtime environments are available for many, if not most, commonly used computer platforms today.

There are essentially two kinds of Java runtime environments: interpreters and just-in-time compilers. Interpreters directly interpret the binary code contained in ".class" files and execute instructions corresponding to that binary code as the interpretation process is carried out. Just-in-time compilers, on the other hand, first translate the binary code into native instructions, then execute the native instructions. Native instructions are instructions that are designed to be executed directly by the computer's hardware.

Java's "write once, run anywhere" philosophy extends not only into the realm of platform independence, but also to that of software internationalization, where a principle of "write once, run anywhere in the world" applies. Java was among the first computer language standards to embrace Unicode, a sixteen-bit character set standard that includes not only the twenty-six letters of modern English, but a variety of characters and accented characters used in other languages. The sixteen-bit standard allows a sufficient range of characters (65,536) not only for the inclusion of multiple alphabets, such as Cyrillic and Hebrew, but also for the character sets of languages such as Chinese and Japanese. Chinese does not use an alphabet but relies on the use of thousands of different ideograms; Japanese uses two alphabets in addition to a set of approximately two thousand ideograms.

Java also provides a facility for internationalization known as "Resource Bundles." Resource bundles are files that store the text messages displayed by a Java program. When a Java program uses resource bundles, it loads its text messages from the resource bundle to be displayed to a user.

By separating text messages from the program code that displays them, it becomes easier to generate versions of a program that display in different languages. To make a German translation of an English original to a program, for instance, one need only create a German resource bundle to be interchanged with the English one. Thus, keeping to Java's "write once, run anywhere" philosophy, the Java program code need only be written and compiled once.

The task of translating a piece of software from one language to another, then, consists of translating the text contained in a resource bundle to produce a replacement resource bundle containing the translation text. Although this scheme is simple from a theoretical and technological standpoint, in practice the task of translating software is more complicated.

It is generally impractical for a software-producing organization to employ a staff of translators for every language at every location in the organization where software is produced. A more practical approach, and one that is generally taken within the industry, is assign the responsibility for software translation to one or more translators in remote locations (often in other countries). In theory, a simple approach to software translation would be to send the resource bundles associated with a product to the translator, have the translator make new resource bundles containing translated text, then have the translator return the new resource bundles.

This approach is error prone, however. The translator, having only the text of the program to look at, is at a loss as to the context in which the text is used. When a translator is given no context in which to understand the text, the translator must make a guess as to which meaning is intended and choose a translation that matches the meaning. For instance, the English word "stop" may be translated into German as "halten," "anhalten," "aufhalten," "aufhören," "abstellen," "einstellen," or "stehenbleiben," depending on the context. The best a translator can do, having only the word "stop" to translate into German, is to pick a likely candidate, for instance "halten." Then, at some later time, the translator can view the completed translated software title to check the context.

Because translators are not usually technically trained or familiar with the technical details of the software they are translating, however, viewing the completed title may be unduly difficult for the translator. Many software products today, particularly those intended to be operated over a network, are difficult to set up and operate, particularly for one with little technical background. It is often impractical for a translator working in a remote location from the software developers to have a working copy of the software installed at the translator's location. When this is the case, often the only viable option is to have the translator travel to the software developers' location and "proofread" the translated software under the direction of the developers.

Another problem that a translator may experience is that the translator may not know enough about operating the software to be able to observe all of the necessary textual messages within the context of the program. In such cases, the developers' assistance is also needed to ensure that all messages are displayed in context for translation.

What is needed then, is a method of translating the text of a software product that reduces the necessity of the translator working face-to-face with software developers.

SUMMARY OF THE INVENTION

The present invention provides techniques for translating the text displayed by a computer program into another language for international use of the program. These techniques simplify the translation process and reduce the necessity for active software developer or programmer involvement with the translation process.

In one embodiment of the invention, data regarding the context in which text is presented to a user is collected from an executing program. This data and the text itself can be forwarded to a translator, who then uses a context interpreter to recreate the presentation of the text in context, without resorting to the use of the original program. The translator can then edit the resource bundle while having its contents displayed in context on the screen Thus, an accurate translation may be made by a translator without the translator's having a copy of the program installed.

In another embodiment of the invention, a sequence of system events corresponding to user actions during an execution session of a program is recorded. This sequence can be forwarded, along with an executable of the program, to a translator. The translator can then use a scripting shell to "playback" the execution session of the program. During "playback," the translator may pause the execution of the program and make editorial changes to text on screen using what is known as an "introspective editor." Thus, a translator may make a translation of a software product without having to know how to operate the software product and without having a software developer or programmer present to demonstrate the software product.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of illustrative embodiments when read in conjunction with the accompanying drawings, wherein:

FIG. 2B is a diagram demonstrating how a translation of software may be made by interchanging resource bundles in accordance with an embodiment of the present invention;

FIG. 3 is a diagram depicting the general operation of an embodiment of the present invention;

FIG. 4 is a listing of a Java class for a GUI feature written in accordance with an embodiment of the present invention;

FIG. 9A is a flowchart representation of a process for storing contextual data (context modules) in accordance with an embodiment of the present invention;

FIG. 9B is a flowchart representation of a process for rendering and editing program text using contextual and textual data in accordance with an embodiment of the present invention;

FIG. 10A is a flowchart representation of a process for recording a sequence of system events in accordance with an embodiment of the present invention; and FIG. 10B is a flowchart representation of a process for reproducing a sequence of system events to affect the execution of a program containing an introspective editor in accordance with an embodiment of the present invention.

DETAILED DESCRIPTION OF PREFERRED EMBODIMENTS

Figure 1:
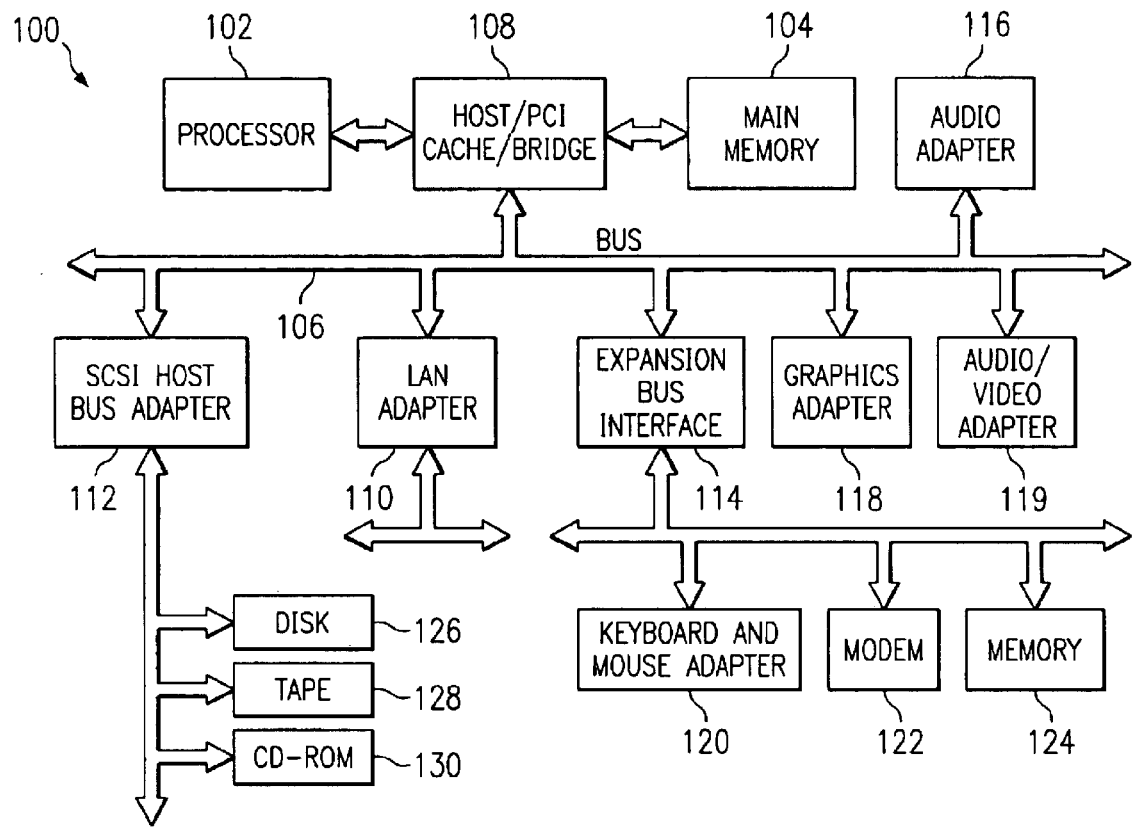
FIG. 1 is a block diagram of a data processing system in the present invention may be implemented.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, CD-ROM 130, and digital video disc read only memory drive (DVD-ROM) 132 in the depicted example. Typical PCI local bus implementations will support three or four PCI expansion slots or add-in connectors. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

Figure 2A:
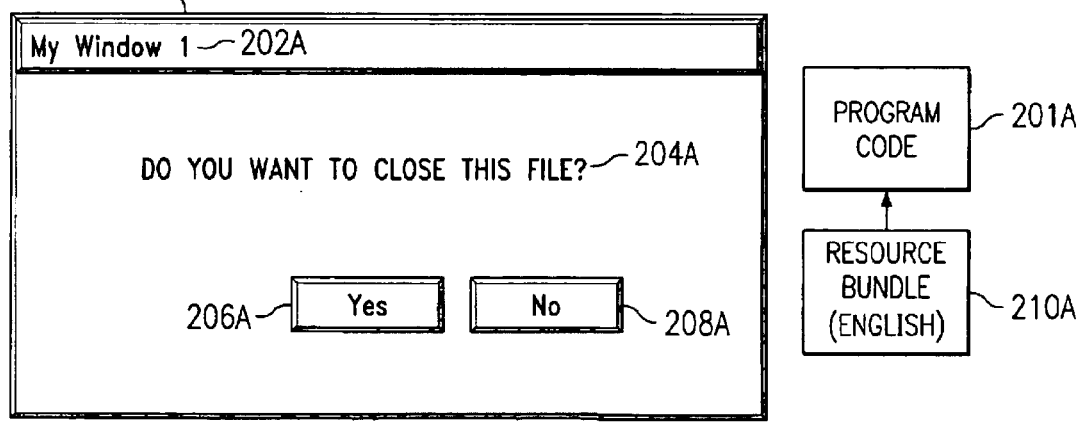
FIG. 2A is a diagram depicting the relationships of a graphical user interface, a resource bundle, and program code in accordance with an embodiment of the present invention.

FIG. 2A is a diagram depicting how language-specific information is separated from an executable program using Java resource bundles in accordance with an embodiment of the present invention. Window 200A is displayed to a user as part of a graphical user interface when executable program code 201A is executed. Window 200A contains several textual and graphical features, including window title 202A, label 204A, and buttons 206A and 208A. The text contained in these features is stored in resource bundle 210A separately from program code 201A. When program code 201A displays window 200A, it loads the text for features 202A, 204A, 206A, and 208A from resource bundle 210A.

As FIG. 2A illustrates, separating executable program code 201A from resource bundle 210A makes it easy to produce new versions of the program to run in different languages. While window 200A in FIG. 2A was in English, window 200B in FIG. 2B is in German. Features 202B, 204B, 206B, and 208B, while rendered similarly to features 202A, 204A, 206A, and 208A of FIG. 2A, have (roughly) equivalent German text substituted for the English. The German text is stored in resource bundle 210B, which is loaded by executable program code 201A, the identical program code as in FIG. 2A. Resource bundle 210B is thus both separate from program code 201A and interchangeable with other resource bundles produced to be used by program code 201A. Translation of a piece of software from one language to another merely requires that a translator prepare a new resource bundle for the new language.

Resource bundle 210B, however, only contains the German text. It does not contain any information about how the text is used within the program, its context. FIG. 3 shows how system 300 of the present invention collects contextual information from an executing program to allow translation of a software product without the translator having access to the executable program.

Program 302 executes in a Java runtime environment on a computer system or other data processing system, such as data processing system 100 in FIG. 1. Monitor process 304 monitors the execution of program 302 to detect when program 302 generates graphical user interface (GUI) features, such as windows, dialog boxes, or menus. Monitor process 304 may execute as a separate executable process from program 302 or as a thread within program 302. Alternatively, monitor process 304 need not be within its own thread or process of execution, but might be implemented as simply a set of functions called by program 302 whenever a GUI feature is generated.

Each time program 302 generates a GUI feature, monitor process 304 generates a context module containing instructions for rendering the GUI feature. This context module is added to a collection of context modules 306. Context modules 306 are then combined with program 302's resource bundles 308 as input to a context interpreter 310, which may be executed on a separate computer and at any time after context modules 306 are generated. Context interpreter 310 uses context modules 306 and resource bundles 308 to reproduce the GUI features originally generated by program 302. The reproduced GUI features are then displayed to a translator on a display device 312.

Context interpreter 310 contains an introspective editor. The introspective editor is a library, that when compiled into an executable program, allows a user to edit GUI features while the program is executing.

When a program compiled with an introspective editor is executing and the user wishes to change the text displayed by the program, the user issues a special keystroke while simultaneously clicking the GUI feature to edit with the mouse. This action brings up a dialog box such as dialog box 604 in FIG. 6, for editing the textual information associated with that feature. The introspective editor is described in commonly assigned, copending application Ser. No. 09/362,615, which is incorporated herein by reference.

The translator can thus provide input 314 to context interpreter 310 to translate the text of the displayed GUI features. Once the translator has finished translating the GUI features, context interpreter 310 produces new resource bundles 316 containing the translation text.

FIG. 4 is a diagram of a Java listing in accordance with one embodiment of the present invention. Those of ordinary skill in the art will appreciate that such a software implementation is not limited to the use of the Java language but may be implemented in any of a variety of computer languages, including but not limited to C, C++, Forth, Lisp, Scheme, Python, Perl, and Assembly Languages of all kinds. It is also to be emphasized that this Java listing is merely an example of one possible implementation of the present invention, included to clarify the basic concepts underlying the invention by providing them in a concrete form. FIG. 4 should not be interpreted as limiting the invention to a particular software implementation.

FIG. 4 depicts one way in which the generation of GUI features can be detected by a monitor process. Java class "GUIFeature2" 400 is a descendent class of ancestral Java class "GUIFeature" (not listed), which generates a GUI feature. In an actual implementation, any GUI feature-generating class, such as "java.awt.Window" could be used as an ancestral class. Class "GUIFeature2" 400 is written to provide the same functionality as "GUIFeature" while collecting contextual data for creating context modules.

Constructor function 402 is called when an instance of class "GUIFeature2" 400 is created. Constructor function 402 takes arguments 403 as input. Arguments 403 are the same arguments that would be passed into the constructor function of ancestral class "GUIFeature." Arguments 403 contain the contextual information necessary to render the GUI feature represented by class "GUIFeature."

Line 404 contains a call to function "Monitor.log_GUIFeature2," which takes arguments 403. Function "Monitor.log_GUIFeature2" creates a context module corresponding to the GUI feature being created by constructor function 402 and inserts the contextual data in arguments 403 into the context module. Finally, on line 406, the constructor function of the ancestral class "GUIFeature" is called using the Java keyword "super." Thus, by creating an instance of class "GUIFeature2" 400, the GUI feature of class "GUIFeature" is generated and the contextual data necessary to generate the GUI feature is stored in a context module.

Figure 5:
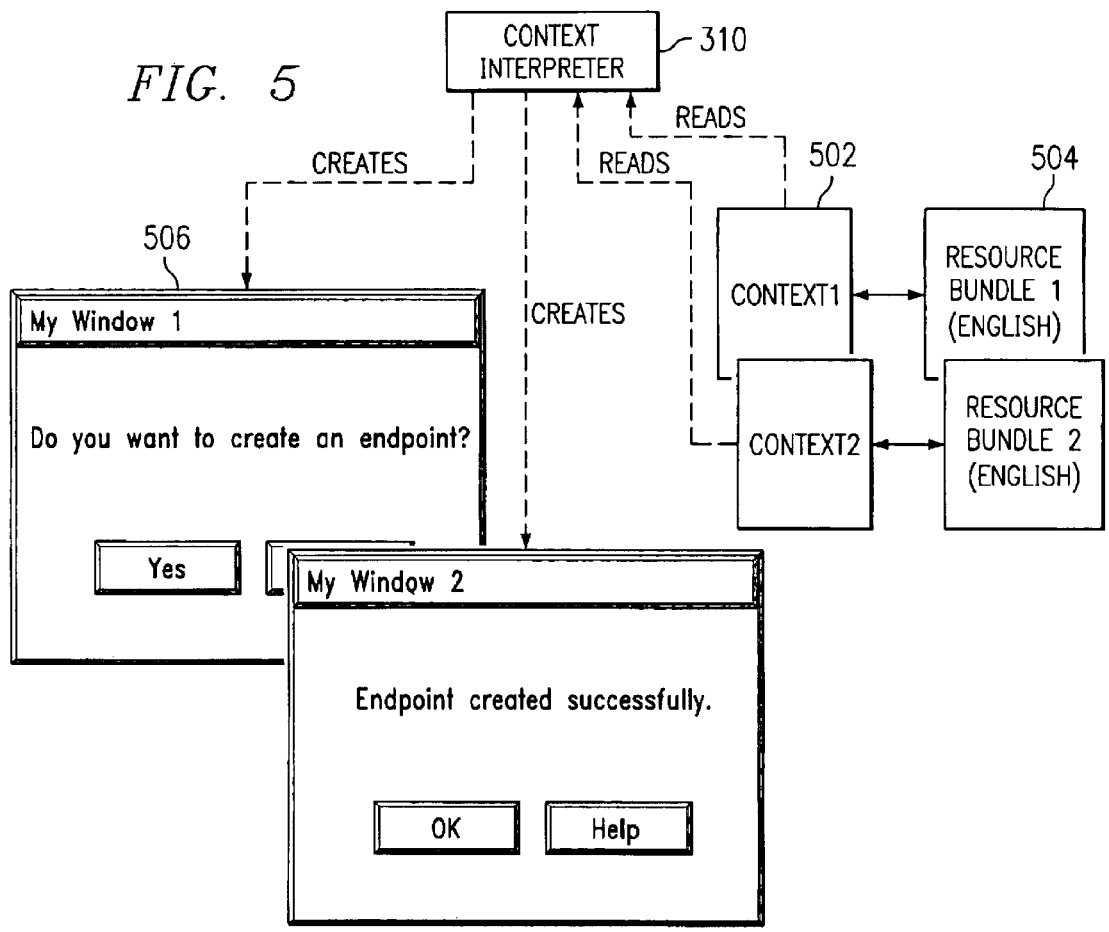
FIG. 5 is a diagram depicting the process of reproducing GUI features for editing from context modules and resource bundles in accordance with an embodiment of the present invention.

FIG. 5 is a diagram depicting the rendering of GUI features from context modules and resource modules using context interpreter 310. Context interpreter 310 combines graphical rendering information from context bundle 502 and combines that information with text from resource bundle 504. Context interpreter 500 then uses the combined information to render GUI feature 506, which in this case is a window.

Figure 6:
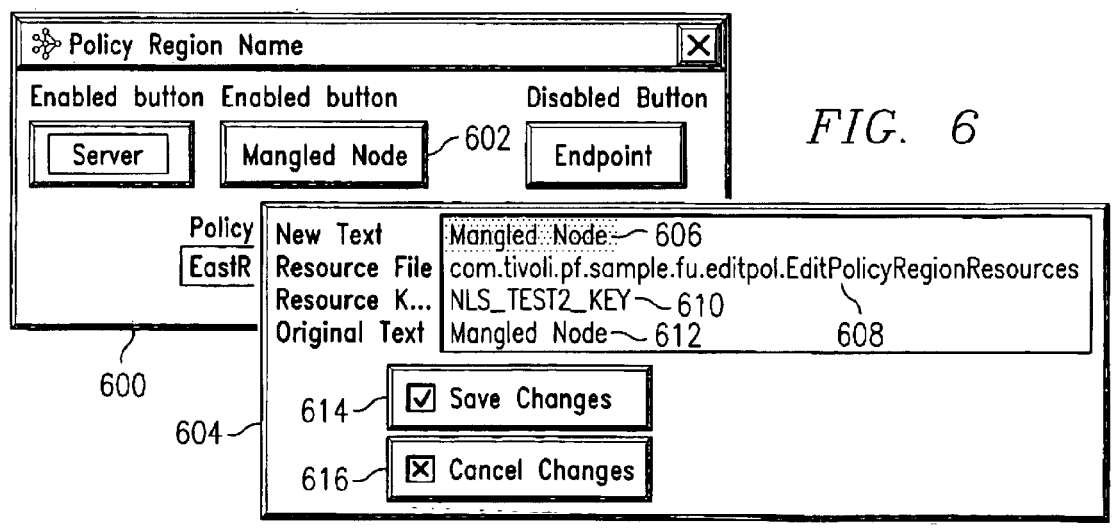
FIG. 6 is a screen shot of an GUI window being edited using an introspective editor in accordance with an embodiment of the present invention.

FIG. 6 is a screen shot of an introspective editor, written in accordance with an embodiment of the present invention. Window 600 contains a button 602, which a user is editing with the introspective editor. The user selects button 602 with a mouse or keyboard, and editing dialog box 604 is displayed.

Dialog box 604 contains fields for editing resource bundle-related information associated with button 602. These fields include the new (replacement) text 606, the particular resource bundle used 608, the resource key 610 for button 602 (which is an internal identification for the GUI feature being edited), and the previous text 612. After editing the fields of dialog box 604 to produce a translation of button 602, the user may use the mouse or keyboard to actuate button 614 to save the translation or button 616 to discard the translation.

Figure 7:
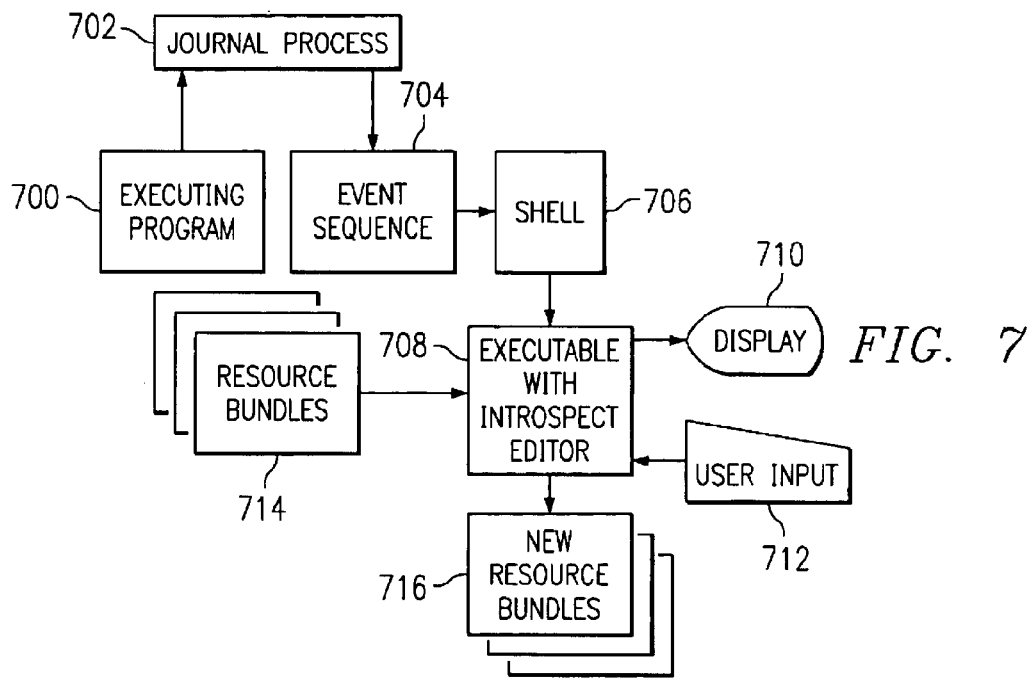
FIG. 7 is a diagram depicting the general operation of an alternative embodiment of the present invention.

FIG. 7 depicts an alternative embodiment of the present invention based on the idea of storing system events to reproduce a sequence of GUI features for translation. Program 700 executes in a Java runtime environment on a computer system or other data processing system. Journal process 702 monitors the execution of program 700 or of the underlying operating system or runtime environment to detect when program 700 processes system events. System events include mouse clicks, keystrokes, and other input/output events.

Journal process 702 may execute as a separate executable process from program 700 or as a thread within program 700. In such cases, journal process 702 will generally monitor a system queue (associated with the operating system of the computer) to detect system events. Alternatively, journal process 702 need not be within its own thread or process of execution, but might be implemented as simply a set of functions called by program 700 whenever a system event is handled by program 700. GUI-based programs generally include an event handler function for receiving system events. System events may be in an event sequence whenever the event handler function executes.

Each time program 700 handles a system event, journal process 702 logs the system event in an event sequence 704. Event sequence 704, then, becomes a transcript of a user's actions during an execution session of program 700.

Event sequence 704 can then be fed as input into a scripting shell 706. Scripting shell 706 executes an executable 708 of program 700 containing an introspective editor, as described in FIG. 6. Thus, whereas in the embodiment described in FIG. 3, the introspective editor was incorporated into context interpreter 310, in the embodiment in FIG. 7, the introspective editor is incorporated into executable 708, a complete executable versions of program 700.

Scripting shell 706 reproduces the same system events (keystrokes, mouse clicks, etc.) that were performed when program 700 was originally executed and event sequence 704 was generated. Scripting shells that reproduce a sequence of system events are well known in the art and are often used to test and debug software. Thus, when scripting shell 706 generates system events while executing executable 708, scripting shell 706 makes executable 708 perform the same tasks and display the same GUI features that program 700 did when originally executed.

Output from executable 708 is displayed on a display device 710. While executable 608 is executing, a user may use an input device 712 such as a mouse or keyboard to direct scripting shell 706 to halt or continue sending system events to executable 708. While scripting shell 706 is halted, the user may use the introspective editor to edit the text in resource bundles 714 associated with program 700, to produce new resource bundles 716 containing the new text.

Figure 8:
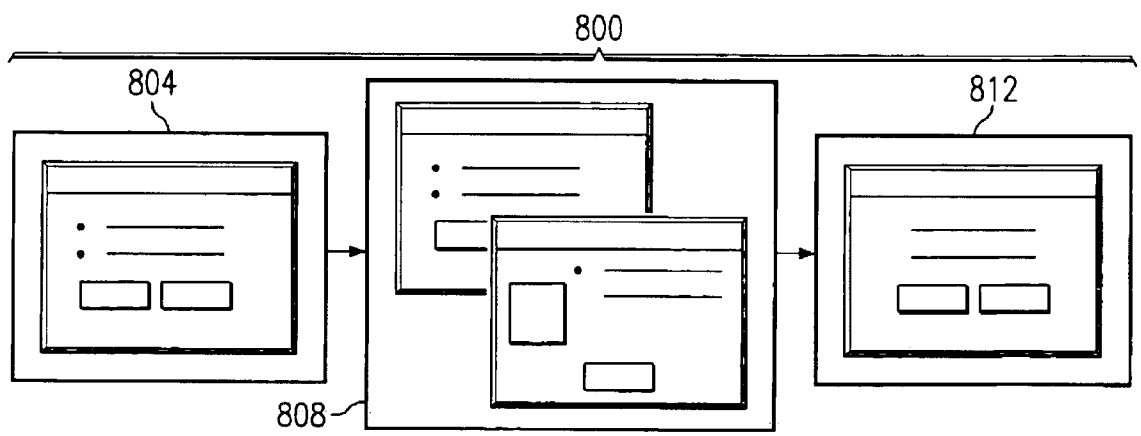
FIG. 8 is a diagram depicting the operation of a scripting shell in conjunction with an introspective editor in accordance with an embodiment of the present invention.

FIG. 8 is a diagram depicting the operation of an alternative embodiment of the present invention in accordance with FIG. 7. Sequence 800 is a sequence of screen shots from an execution of executable 708 (in FIG. 7) using event sequence 704. Event sequence 704 is a list of system events that occurred during an initial execution of program 702 (in FIG. 7).

Screen 804 shows what the user's screen looks like when program 702 or executable 708 is first executed. After scripting shell 706 (from FIG. 7) makes event 806 from event sequence 704 occur, screen 808 replaces screen 804 on the user's display. In this case, event 806 is a click of the mouse at a particular point. At any time the user may halt scripting shell 706 from generating system events and edit any of the GUI features on screen 808 using the introspective editor before resuming scripting shell 706.

Similarly, after scripting shell 706 generates event 810, the next event in event sequence 704, screen 808 is replaced with screen 812. This process can continue until scripting shell 706 generates the last event in event sequence 704.

FIG. 9A is a flowchart representation of the operation of a monitor process, such as monitor process 304 in FIG. 3, in an embodiment of the present invention implemented in accordance with the diagram in FIG. 3. If a GUI feature is to be generated (step 902), then data regarding how the feature is to be rendered is stored in a context bundle (step 904). Finally, the GUI feature is generated and displayed for the user (step 906) and the process cycles back to step 902.

FIG. 9B is a flowchart representation of the operation of context-interpreter, such as context interpreter 310, in an embodiment of the present invention implemented in accordance with the diagram in FIG. 3. First, the program reads rendering data from a context bundle and textual data from, for instance, a Java resource bundle (step 908). Next, the rendering data and textual data are combined and the GUI feature is rendered complete with its associated text (step 910). Next, the user may edit the text of the GUI feature (step 912). Finally, the new text is saved (in a new resource bundle) (step 914), with the process terminating thereafter.

FIG. 10A is a flowchart representation of the operation of a journal process, such as journal process 702 in FIG. 7, and executing program, such as executing program 700 in FIG. 7, in an embodiment of the present invention implemented in accordance with the diagram in FIG. 7. If a system event has occurred (step 1000), the journal process records the event in an event sequence (step 1002). Next, the system event is handled by the executing program (step 1004) and the process cycles back to step 1000.

FIG. 10B is a flowchart representation of a scripting shell, such as scripting shell 706 in FIG. 7, in an embodiment of the present invention implemented in accordance with the diagram in FIG. 7. First, the scripting shell starts the execution of an introspective editor-containing executable file of the program to be translated (step 1006). Then a system event record is retrieved from an event sequence (step 1008). Next, the system event represented by the record is generated so as to affect the execution of the executable (step 1010). The process then recycles back to step 1006 to read and generate the next system event in the event sequence.

One of ordinary skill in the art will appreciate that although the embodiments described herein make use of the Java programming language and the resource bundle facility in that language, the techniques described herein are applicable to a variety of other programming environments as well. For instance, it is a common practice to use "catalog files" to store text, regardless of the programming language used. Catalog files are files that, like resource bundles, store a series of text messages to be displayed by a program and are interchangeable with other catalog files in different (human) languages.

One of ordinary skill in the art will also appreciate that in some computing environments, such as Microsoft Windows for example, it is common practice to store GUI rendering information (and text as well) in separate files from program source code. These files are called "resource files." In an alternative embodiment of the present invention, resource files may be used in place of context modules, resource bundles, or both, for editing purposes.

Further, one of ordinary skill in the art will recognize that such text to be viewed in context and translated need not be confined to text displayed within a graphical user interface (GUI). Rather, the text translated using the present invention could include text displayed in a non-graphical environment, or text to be printed or otherwise conveyed to a user. Regardless of whether the text is displayed as part of a GUI, contextual data, such as how the text is arranged on a screen or printed on a page is still present and can still be recorded and used within an embodiment of the present invention.

Moreover, the present invention need not be limited to the translation of text. The present invention is applicable to the editing of computer program text in general. An editor, for instance, could use an embodiment of the present invention to correct grammar and punctuation mistakes in a program's text, rather than make a translation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for editing text used in a user interface of a computer program, comprising the steps of:
    monitoring execution of the computer program to identify events associated with one or more graphical user interface (GUI) components;
    generating, during execution of the computer program, contextual information for the identified events, wherein the contextual information provides information defining a context in which text associated with the one or more GUI components is presented;
    receiving the text in a first user interface text storage format;
    combining the contextual information with the text to form a visual representation of the one or more graphical user interface components;
    displaying the visual representation; and
    providing an editor for editing the text in the displayed visual representation.

2. The method of claim 1, further comprising the step of:
    receiving editing instructions to edit the text via the editor; and
    based on the editing instructions, generating new text for use with the one or more graphical user interface components.

3. The method of claim 2, further comprising the step of:
    storing the new text in a second user interface text storage format.

4. The method of claim 1, wherein the first user interface text storage format is a catalog file.

5. The method of claim 1, wherein the first user interface text storage format is a resource bundle.

6. The method of claim 1, wherein the contextual information includes graphical user interface (GUI) rendering information.

7. The method of claim 1, wherein the computer program is written in Java.

8. A method for generating an editable representation of a user interface in an executing computer program, comprising the steps of:
    detecting when the executing computer program generates a user interface feature;
    recording a description of the user interface feature, during execution of the computer program, wherein the description includes information regarding the rendering of the user interface feature;
    associating the description with an item of text in a user interface text storage format;
    replaying generation of the user interface feature based on the description as associated with the item of text; and
    providing an editor for editing the item of text during replaying of the generation of the user interface.

9. The method of claim 8, wherein the user interface is a graphical user interface (GUI).

10. The method of claim 8, wherein the user interface text storage format is a resource bundle.

11. The method of claim 8, wherein the executing computer program is written in Java.

12. A method for editing text used in a user interface of a computer program, comprising the steps of:
    receiving a sequential record of system events that occurred during an execution session of the computer program;
    executing an executable of the computer program, wherein the executable contains an introspective editor;
    reproducing the system events from the sequential record to control execution of the executable; and
    receiving edit instructions, via the introspective editor, during reproducing of the system events, to thereby edit text used in a user interface presented by execution of the executable of the computer program during reproduction of the system event.

13. The method of claim 12, further comprising the step of:
    responsive to a user input, suspending execution of the reproducing step.

14. The method of claim 13, further comprising the step of:
    responsive to a second user input, resuming the execution of the reproducing step.

15. The method of claim 12, wherein the system events include at least one of a keystroke, a mouse click, a mouse double-click, and a mouse drag.

16. A computer program product, in a computer-readable medium, for editing text used in a user interface of a computer program, comprising instructions for:
    monitoring execution of the computer program to identify events associated with one or more graphical user interface (GUI) components;

generating, during execution of the computer program, contextual information for the identified events, wherein the contextual information provides information defining a context in which text associated with the one or more GUI components is presented;

receiving the text in a first user interface text storage format;

combining the contextual information with the text to form a visual representation of the one or more graphical user interface components;

displaying the visual representation; and providing an editor for editing the text in the displayed visual representation.

17. The computer program product of claim 16, further comprising instructions for:

receiving editing instructions to edit the text via the editor; and based on the editing instructions, generating new text for use with the one or more graphical user interface components.

18. The computer program product of claim 17, further comprising instructions for:

storing the new text in a second user interface text storage format.

19. The computer program product of claim 16, wherein the first user interface text storage format is a catalog file.

20. The computer program product of claim 16, wherein the first user interface text storage format is a resource bundle.

21. The computer program product of claim 16, wherein the contextual information includes graphical user interface (GUI) rendering information.

22. The computer program product of claim 16, wherein the computer program is written in Java.

23. A computer program product, in a computer-readable medium, for generating an editable representation of a user interface in an executing computer program, further comprising instructions for:

detecting when the executing computer program generates a user interface feature;

recording a description of the user interface feature, during execution of the computer program, wherein the description includes information regarding the rendering of the user interface feature;

associating the description with an item of text in a user interface text storage format;

replaying generation of the user interface feature based on the description as associated with the item of text; and providing an editor for editing the item of text during replaying of the generation of the user interface.

24. The computer program product of claim 23, wherein the user interface is a graphical user interface (GUI).

25. The computer program product of claim 23, wherein the user interface text storage format is a resource bundle.

26. The computer program product of claim 23, wherein the executing computer program is written in Java.

27. A computer program product, in a computer-readable medium, for editing text used in a user interface of a computer program, further comprising instructions for:

receiving a sequential record of system events that occurred during an execution session of the computer program;

executing an executable of the computer program, wherein the executable contains an introspective editor;

reproducing the system events from the sequential record to control execution of the executable; and receiving edit instructions, via the introspective editor, during reproducing of the system events, to thereby edit text used in a user interface presented by execution of the executable of the computer program during reproduction of the system event.

28. The computer program product of claim 27, further comprising instructions for:

responsive to a user input, suspending execution of the instructions for reproducing.

29. The computer program product of claim 28, further comprising instructions for:

responsive to a second user input, resuming the execution of the instructions for reproducing.

30. The computer program product of claim 27, wherein the system events include at least one of a keystroke, a mouse click, a mouse double-click, and a mouse drag.

31. A data processing system executing a program that displays text, the data processing system comprising:

a bus system;

a memory connected to the bus system, wherein the memory includes a set of instructions; and a processing unit, wherein the processing unit includes at least one processor, wherein the processing unit executes the set of instructions to perform the acts of:

monitoring execution of the computer program to identify events associated with one or more graphical user interface (GUI) components;

generating, during execution of the computer program, contextual information for the identified events, wherein the contextual information provides information defining a context in which text associated with the one or more GUI components is presented;

receiving the text in a first user interface text storage format;

combining the contextual information with the text to form a visual representation of the one or more graphical user interface components;

displaying the visual representation; and providing an editor for editing the text in the displayed visual representation.

32. The data processing system of claim 31, wherein the processing unit executes the set of instructions to perform the additional acts of:

receiving editing instructions to edit the text via the editor; and based on the editing instructions, generating new text for use with the one or more graphical user interface components.

33. The data processing system of claim 32, wherein the data processing system executes the set of instructions to perform the additional act of:

storing the new text in a second user interface text storage format.

34. The data processing system of claim 31, wherein the first user interface text storage format is a catalog file.

35. The data processing system of claim 31, wherein the first user interface text storage format is a resource bundle.

36. The data processing system of claim 31, wherein the contextual information includes graphical user interface (GUI) rendering information.

37. The data processing system of claim 31, wherein the program is written in Java.

38. A data processing system to generate an editable representation of a user interface in an executing program, the data processing system comprising:

a bus system;

a memory connected to the bus system, wherein the memory includes a set of instructions; and a processing unit, wherein the processing unit includes at least one processor, wherein the processing unit executes the set of instructions to perform the acts of:

detecting when the executing computer program generates a user interface feature;

recording a description of the user interface feature, during execution of the computer program, wherein the description includes information regarding the rendering of the user interface feature;

associating the description with an item of text in a user interface text storage format;

replaying generation of the user interface feature based on the description as associated with the item of text; and providing an editor for editing the item of text during replaying of the generation of the user interface.

39. The data processing system of claim 38, wherein the user interface is a graphical user interface (GUI).

40. The data processing system of claim 38, wherein the user interface text storage format is a resource bundle.

41. The data processing system of claim 38, wherein the executing program is written in Java.

42. A data processing system to edit text used in a user interface of a program, the data processing system comprising:

a bus system;

a memory connected to the bus system, wherein the memory includes a set of instructions; and a processing unit, wherein the processing unit includes at least one processor, wherein the processing unit executes the set of instructions to perform the acts of:

receiving a sequential record of system events that occurred during an execution session of the computer program;

executing an executable of the computer program, wherein the executable contains an introspective editor;

reproducing the system events from the sequential record to control execution of the executable; and receiving edit instructions, via the introspective editor, during reproducing of the system events, to thereby edit text used in a user interface presented by execution of the executable of the computer program during reproduction of the system event.

43. The data processing system of claim 42, wherein the data processing system executes the set of instructions to perform the additional act of:

responsive to a user input, suspending execution of the instructions for reproducing.

44. The data processing system of claim 43, wherein the data processing system executes the set of instructions to perform the additional act of:

responsive to a second user input, resuming the execution of the instructions for reproducing.

45. The data processing system of claim 42, wherein the system events include at least one of a keystroke, a mouse click, a mouse double-click, and a mouse drag.

46. The method of claim 1, wherein displaying the visual representation includes providing the contextual information and the text to a context interpreter which generates the visual representation as a recreation of the text, in the context described by the contextual information, without using the computer program to generate the visual representation.

47. The method of claim 1, wherein displaying the visual representation includes providing the contextual information and text to a scripting shell, wherein the scripting shell replays an execution session of the computer program, and wherein providing an editor for editing the text in the displayed visual representation includes providing an introspective editor during replaying of the execution session of the computer program.

48. The method of claim 47, wherein the introspective editor is provided during replaying of the execution session of the computer program in response to user input halting replaying of the execution session.

49. The method of claim 8, wherein replaying generation of the user interface feature includes providing the description and item of text to a scripting shell, wherein the scripting shell replays an execution session of the computer program, and wherein providing an editor for editing the item of text includes providing an introspective editor during replaying of the execution session of the computer program.

50. The method of claim 49, wherein the introspective editor is provided during replaying of the execution session in response to user input halting replaying of the execution session.

* * * * *